United States Patent [19]

Knudsen et al.

[11] 4,357,241

[45] Nov. 2, 1982

[54] BATCHWISE GRAVITATIONAL SEPARATION OF AN EMULSION USING PLURAL VERTICALLY SUPERIMPOSED CHAMBERS

[75] Inventors: Ib H. Knudsen, Alexandria, Scotland; Bror A. O. Lindström, Landskrona; Nils-Eric Carlsson, Marieholm, both of Sweden

[73] Assignee: Supra Aktiebolag, Landskrona, Sweden

[21] Appl. No.: 211,245

[22] Filed: Nov. 28, 1980

[51] Int. Cl.$^3$ .............................................. B01D 17/04
[52] U.S. Cl. .................................... 210/708; 210/774; 210/802; 210/187; 210/522; 210/536; 210/540; 208/187
[58] Field of Search ............... 210/708, 774, 801, 802, 210/187, 521, 522, 536, 537, 540, DIG. 5; 208/187

[56] References Cited

U.S. PATENT DOCUMENTS

| | | | |
|---|---|---|---|
| 1,709,971 | 4/1929 | Coe ..................................... | 210/536 |
| 2,181,684 | 11/1939 | Walker ................................ | 210/187 |
| 4,022,688 | 5/1977 | Wikholm ............................. | 210/71 |

*Primary Examiner*—David R. Sadowski
*Attorney, Agent, or Firm*—Fleit & Jacobson

[57] ABSTRACT

For separating an emulsion comprising substantially a heavier and a lighter liquid there is used a plurality of superimposed, liquid-filled, shallow separation chambers which have a lower outlet for separated heavier liquid, an upper outlet for separated lighter liquid, and an emulsion-inlet remote from the outlets. The separation chambers are maintained under an overpressure by causing the heavier and the lighter liquid, separated in the chambers by self-separation under the action of gravity, to pass from the chambers via a respective one of two pressure-holding vessels containing a respective heavier or lighter liquid. The emulsion is fed batchwise into at least one separation chamber at a time, at a temperature greater than the temperature of the liquid already present in the chamber, and in a volumetric amount which is less than the volume of the chamber. While supplying the emulsion to the chamber, the lighter-liquid outlet of the chamber is held closed while the outlet for the heavier liquid is held open, so that the emulsion fed to the chamber displaces a corresponding amount of solely heavier liquid from the separation chamber. The emulsion inlet of the chamber is then closed and its outlet for lighter liquid is opened, whereat separated lighter liquid in the chamber is forced out through an associated outlet by causing a corresponding amount of separated heavier liquid to flow from the pressure-holding vessel containing the heavier liquid back into the separation chamber.

15 Claims, 1 Drawing Figure

U.S. Patent    Nov. 2, 1982    4,357,241
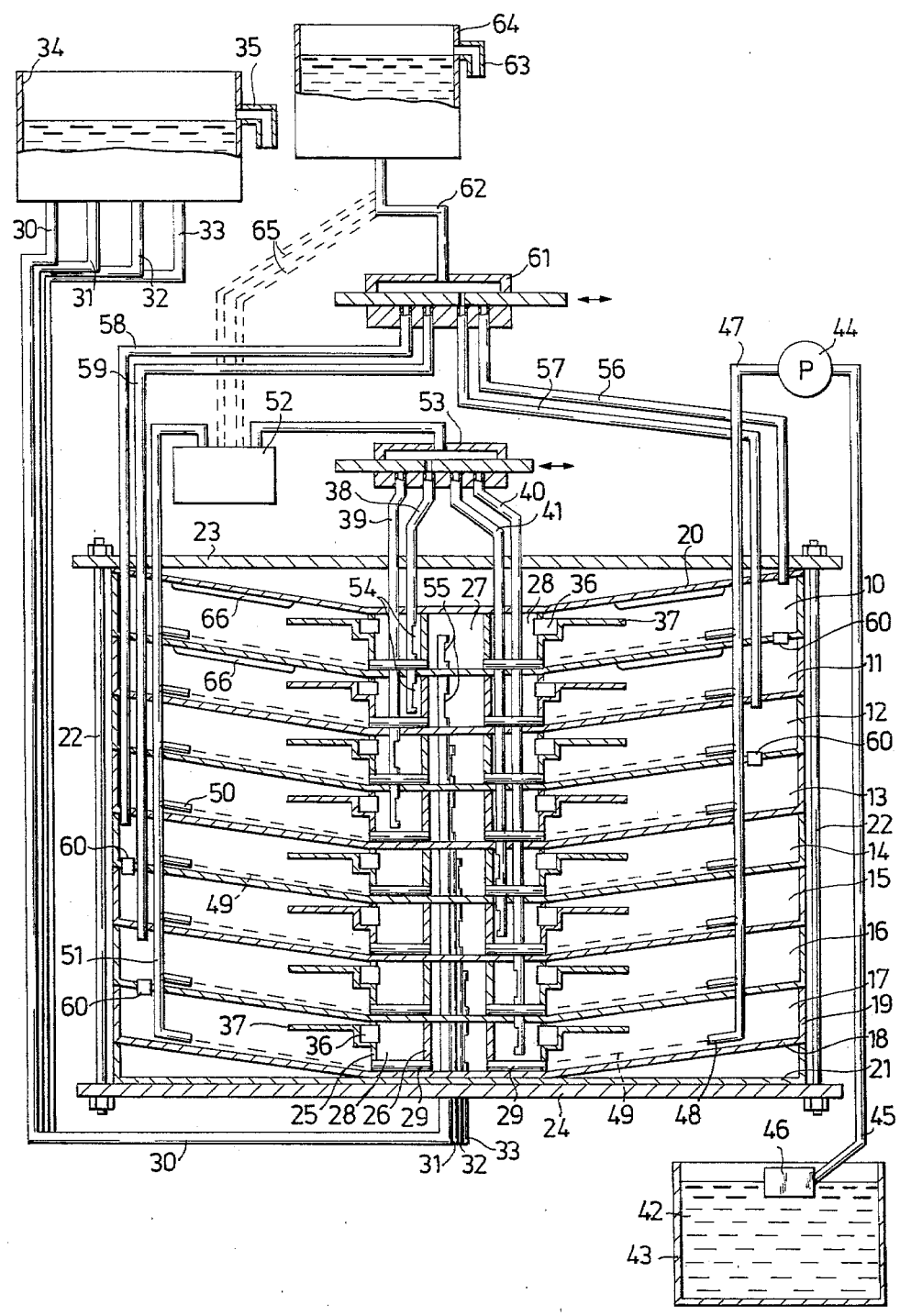

BATCHWISE GRAVITATIONAL SEPARATION OF AN EMULSION USING PLURAL VERTICALLY SUPERIMPOSED CHAMBERS

The present invention relates to a method of separating an emulsion comprising substantially a heavier liquid and a lighter liquid, using a plurality of closed, liquid-filled separation chambers having a substantial horizontal extension compared with their vertical extension, and each of which has a lower outlet for separated heavier liquid, an upper outlet for separated lighter liquid, said upper outlet preferably being located at a higher level than the remainder of the separation chamber, and an inlet for emulsion located at a substantial flow distance from the said two outlets, whereat the separation chambers are kept at an overpressure by causing the heavier and lighter liquids separated gravitationally during the actual separation process to depart from said chambers via a respective one of two pressure-holding vessels containing heavier and lighter liquid respectively and having a weir so located above the uppermost part of the uppermost separation chamber that with the pressure-holding vessels communicating with each other through at least one of the separation chambers equilibrium will occur in the thus formed U-pipe system only when separated lighter liquid is not present beneath the outlet for lighter liquid of the uppermost separation chamber. The invention also relates to an apparatus for carrying out the method.

A method of the aforedescribed kind and an apparatus for carrying out said method are previously known from, for example, the U.S. Pat. No. 1,709,971. Because, inter alia, of the continuous separation process described in this patent specification and because of the structural design of the apparatus, the separation results obtained are not satisfactory, however. Consequently, it is suggested in U.S. Pat. No. 4,022,688 that there are used as separation chambers a plurality of shallow vessels which are arranged in spaced relationship one above the other and are open at the top thereof and which have a weir connected to a respective outlet for separated heavier and lighter liquids. The weirs are so arranged that a layer of the lighter liquid is constantly held in each separation chamber. The emulsion to be demulsified is heated in a manner known per se and is introduced into a respective chamber at a location immediately beneath said layer of lighter liquid, which is very thin, while simultaneously successively displacing both separated heavier liquid and separated lighter liquid via respective weirs. One disadvantage with this latter known method and apparatus is that the separation chambers must be precisely horizontal and the weirs must be positioned very exactly with respect to each other and with respect to associated separation chambers, in order for a satisfactory result to be obtained. Further, vibrations and other movements can give rise to ripples on the surface of the liquid, which deleteriously affects the separation result.

The object of the present invention is to provide an improved method and an improved apparatus for carrying out the method in which the aforementioned disadvantages are at least substantially eliminated.

To this end it is proposed in accordance with the invention that in a method of the kind described in the introduction the emulsion is fed, in a manner known per se, batchwise into at least one separation chamber at a time, at a temperature greater than the temperature of the liquid already present in said chamber and in a volumetric quantity which is less than the volume of said chamber; that during the introduction of the emulsion into the chamber the lighter-liquid outlet of said chamber is held closed and the heavier-liquid outlet is held open so that the emulsion charged to said chamber displaces a corresponding amount of solely heavier liquid from said separation chamber; and that the emulsion inlet of said chamber is then closed and the outlet for said lighter liquid opened so that the lighter liquid separated in said chamber from said emulsion during the separation process is forced through an associated outlet, by the fact that a corresponding amount of separated heavier liquid flows from the pressure-holding vessel containing said heavier liquid back into the separation chamber. These procedural steps combine the advantages of the known continuous and discontinuation separation methods while avoiding the disadvantages of said methods. Thus, there is less sensitivity to vibrations and other small movements. Further, the separation chambers and their outlets for separated heavier and lighter liquids need not be positioned so exactly while affording the possibility of removing the lighter liquid automatically and in a very reliable fashion with the aid of simple means.

For the purpose of accelerating the separation process, the liquid located adjacent the bottom of each separation chamber may suitably be cooled, preferably by indirect heat exchange with a cold emulsion whose constituents are to be separated from each other.

For the purpose of maintaining the desired temperature gradient in the separation chambers, the emulsion heated by said heat exchange can be further heated, suitably by means of physical heat gained from the separated heavier and/or lighter liquids, for example, with the aid of a heat pump, and then introduced into a separation chamber for the separation of the emulsion.

Particularly smooth and advantageous separation and operational conditions are obtained when the separation chambers are kept out of communication with at least the pressure-holding vessel containing said lighter liquid during the major part of the separation process, and when emulsion is introduced into selected groups of separation chambers and the heavier and lighter liquids are tapped from such selected groups.

For the purpose of ensuring an optimal emulsion-inflow pattern, there are used shallow, circular separation chambers, whereat emulsion is introduced into the centre of a respective separation chamber, and the separated lighter liquid is removed at the periphery of said chamber.

As previously mentioned, the invention also relates to an apparatus for the separation of an emulsion comprising substantially a heavier and a lighter liquid, said apparatus comprising a plurality of closed liquid-filled separation chambers arranged one above the other and having a substantial horizontal extension compared with their vertical extension, each of said chambers having a lower outlet for separated heavier liquid, an upper outlet for separated lighter liquid, said upper outlet preferably being located at a higher level than the remainder of the separation chamber, and an inlet for emulsion arranged at a substantial distance from said two outlets, whereat the outlet of said separation chambers for heavier and lighter liquid respectively are each connected to a respective pressure-holding vessel containing heavier and lighter liquids respectively with a liquid level located above the uppermost part of the uppermost separation chamber, whereat the liquid levels in the two pressure-holding vessels are so adjusted relative to one another that, with the pressure-holding vessels in communication with each other through at least one of the separation chambers, equilibrium will not occur in the thus formed U-tube system until the separated lighter liquid is not beneath the level of the outlet for lighter liquid of the uppermost separation chamber, whereat the apparatus for solving the problem on which the invention is based is mainly characterized in that the separation chambers are co-ordinated with means for heating and introducing emulsion batchwise into at least one separation chamber at a time with the outlet of said chamber for lighter liquid being closed and the outlet for heavier liquid open, while displacing a corresponding amount of said heavier liquid; and in that means are provided for passing separated lighter liquid through associated outlets while introducing a corresponding amount of separated heavier liquid into the separation chamber.

Further characterizing features of the apparatus and advantages afforded thereby are disclosed and set forth in the following description which is made with reference to an apparatus according to the invention schematically illustrated in the accompanying drawing, the single FIGURE of which is a substantially vertical sectional view of said apparatus.

The illustrated apparatus for the separation of an emulsion comprising substantially a heavier and a lighter liquid includes a plurality of shallow, circular separation chambers 10–17 which are inclined slightly upwardly from the central region of said apparatus to the peripheral region thereof. The chambers 10–17 are formed by bowl-like elements each having a bottom 18 and an upstanding peripheral wall 19, whereat the bowl-like elements are stacked directly on top of each other, so that the bottoms 18 form the bottom of one separation chamber and the roof of an immediately underlying separation chamber. The uppermost separation chamber 10 is covered with a lid or cover 20 while the lowermost separation chamber 17 is supported by a bowl-like element 21 having a shape which differs from the shape of the elements 18, 19. The bowl-like elements 18, 19, the lid 20 and the element 21 are held together in the form of a stack by means of a plurality of tension rods 22 which act between upper and lower plates 23, 24. Each bowl-like element 18, 19 has arranged in the region of its centre, two upstanding tubular walls 25, 26 which are coaxial with one another and with the wall 19 and the upper edge of which is in sealing abutment with the underside of an overlying bowl-like element 18, 19 or the lid 20, to define cylindrical, central spaces 27 and annular spaces 28 which encircle said spaces 27 and which are separated therefrom by walls 26.

Each space 27 communicates with an associated separation chamber through a plurality of pipes 29 extending substantially radially through the walls 25, 26 adjacent the bowl-bottom 18, said associated separation chamber being ring-shaped and defined outwardly by a respective bowl-wall 19 and inwardly by a respective wall 25. The pipes 29 form outlets for heavier liquid separated in the separation chambers 10–17, said liquid passing through the pipes 29 to the spaces 27, from where they are passed further through pipes 30, 31, 32, 33 having inlet openings 55, to a pressure-holding vessel 34. The pipes 30–33 discharge into the bottom of the vessel 34, which comprises an open-top tank which preferably has a large volume and which is provided with a weir 35.

Each wall 25 is provided in the region of its upper portion with a plurality of through-passing openings 36 distributed around said wall, through which openings the spaces 28 communicate with associated separation chambers. These openings 36 form the inlets of the separation chambers 10–17 for emulsion to be separated. By means of baffles 37 which extend substantially radially from the walls 25 around the centre of the apparatus the flow distance between the emulsion inlet 36 and the outlet 29 for separated heavier liquid is made quite considerable, besides ensuring a favourable inflow pattern for emulsion fed to the apparatus. The emulsion 42 to be separated is passed to the spaces 28 through one of the pipes 38, 39, 40, 41, from a tank 43. Emulsion is drawn from the tank 43 by means of a suction pump 44 arranged in a suction line 45, through an emulsion intake which is supported in the region of the surface of the emulsion 42 by means of a float arrangement 46. The pressure side of the pump 44 is connected to a line 47 which extends downwardly through the separation chambers 10–17 and which is connected, by means of branch pipes 48, to a respective one of a plurality of cooling devices having the form of cooling coils 49, shown in dash lines, located adjacent the bottom of a respective separation chamber.

The emulsion used for cooling purposes passes from the coils 49 to a riser pipe 51 via branch lines 50, wherewith the emulsion is passed to a heater 52. The heated emulsion is then passed from said heater 52, via a selector valve 53, to a selected one of the lines 38–41.

In the illustrated embodiment, the separation chambers 10–17 are arranged in groups. More specifically, the chambers 10 and 11 form a first group, the chambers 12 and 13 form a second group, the chambers 14 and 15 form a third group and the chambers 16 and 17 form a fourth group. In practice there is normally more than four groups and usually each group comprises more than two separation chambers. The groups are arranged to be supplied with emulsion and to be tapped with respect to separated heavier liquid through different inlet lines 38–41 and different outlet lines 30–33 respectively. Thus, the line 38 has openings 54 for supplying emulsion solely to the group of chambers 10,11, while the line 30 has openings 55 for removing separated heavier liquid from the same group of chambers. In a corresponding manner, the lines 31 and 39 are co-ordinated solely with the separation chambers 12, 13, while the lines 32 and 40 are arranged to co-operate solely with chambers 14, 15 and the lines 33 and 41 are arranged to co-operate solely with chambers 16, 17.

The separated lighter liquid is collected in the separation chambers 10–17 at the highest peripheral region of said chambers, from where the liquid is removed through lines 56, 57, 58 and 59, which discharge at the top thereof into the upper separation chambers 10, 12, 14 and 16 respectively of a respective separation-chamber group. The separated lighter liquid is able to pass from the underlying chambers 11, 13, 15, 17 in the groups through a connection 60 between the chambers within each group of chambers, to the upper chambers 10, 12, 14 and 16 of said groups, and out through one of the lines 56–59. In practice a plurality of lines 56–59 and connections 60 are distributed around the periphery of the separation chambers, whereat the lines extending from one and the same chamber are brought together upstream of a selector valve 61, said lines discharging in said valve in the illustrated manner. By means of the selector valve 61, three of the lines 56–59 are constantly held closed, while one of the lines is in open connection, via a line 62, with the bottom of a collecting tank 64 provided with a weir 63, said tank 64 forming a pressure-holding vessel, similar to the tank 34.

The tanks 34 and 64, or the weirs 35 and 63 respectively of said tanks, are suitably vertically adjustable so that a desired overpressure can be set in the separation chambers 10–17. The tanks 34, 64 together with the riser pipe for separated lighter liquid (in the illustrated position the line 57) which at the illustrated moment communicates via the valve 61, with the tank 64, the separation-chamber group 12, 13 associated with said riser pipe, and the outlet line 31 associated with said group for the separated heavier liquid, form a U-tube system, whereat the liquid levels, determined by the weirs 35, 63 by adjusting the tank 34, 64 or the weirs 35, 63 relative to one another, are so adjusted in relation to each other that equilibrium will not occur in the U-tube system until separated lighter liquid is not located beneath the level of the outlet for lighter liquid of the uppermost separation chamber 10.

For the purpose of saving energy, the energy used for heating the emulsion can be recovered, either completely or partially prior to introducing the emulsion into one of the separation chambers 10–17. For example, the heater 52 may comprise a heat pump which, as indicated by the line 65, can be arranged to operate with heat recovered from the separated lighter and/or heavier liquids.

Prior to using the illustrated apparatus, the separation chamber 10–17 and the pressure-holding vessels can be filled solely with heavier liquid. Since only heavier liquid will then be present in the pressure-holding vessel 64, the level of said liquid in said vessel will thus lie beneath the level of the weir 63. With the valves 53, 61 in the illustrated position, emulsion is pumped into the separation chambers 10, 11 via the lines 45, 47, 51 and 38, to an amount corresponding, for example, to a quarter of the total volume of said chambers, said emulsion being heated in the means 52 prior to entering the separation chambers. The emulsion thus displaces from the chambers 10, 11 a corresponding amount of heavier liquid which leaves the apparatus via the line 30, the tank 34 and the weir. The setting of the valves 53 and 61 is then changed, by displacing the valveslides in the manner indicated by the arrows, so that the line 39 communicates with the emulsion tank 43 and so that communication of the line 57 with the tank 64 is broken, whereon emulsion heated in the arrangement 52 is supplied to the separation chambers 12 and 13, while displacing a corresponding amount of heavier liquid. In a corresponding manner, emulsion is fed to the group comprising chambers 14, 15 and to the group comprising chambers 16, 17. The emulsion pumped into the separation chambers 10–17, which emulsion as a result of being heated and, to a certain extent, also as a result of its composition, has a lower density than the said heavier liquid, lies in the form of a layer in each separation chamber, said layer floating on the residual heavier liquid. Subsequent to feeding the desired quantity of emulsion to said chambers, the emulsion is permitted to separate gravitationally while being substantially stationary, whereat the separated lighter liquid is collected in the highest regions of the chambers 10–17 in the form of a buoyant layer. The lighter liquid passes from said layer through the openings 60, up into overlaying separation chambers, from where the lighter liquid passes to the tank 64 when a respective chamber is brought into communication with said tank by corresponding setting of the valve 61.

When a steady state has been reached in the illustrated apparatus, one of the groups of separation chambers is constantly held in communication with the tank 64, while emulsion is supplied to a further group of separation chambers and other groups of separation chambers are held out of communication with both the tank 43 and the tank 64. Thus, in the illustrated position the separation chambers 10 and 11 are being filled while separated lighter liquid is able to pass from the chamber 13 to the chamber 12, and from the chamber 12 to the tank 64. The emulsion pumped by the pump 44, which emulsion is relatively cold, is divided into part flows by the branch pipes 48, said part flows passing through cooling coils 49 in a respective one of the separation chambers 10–17, so that the desired temperature gradient is constantly maintained in the chambers 10–17 by cooling.

The illustrated arrangement with the introduction of the emulsion radially outwardly from the central region of the separation chambers 10–17 provides a very favourable flow pattern with the rate of flow of the emulsion falling greatly towards the outlet for separated lighter liquid. Discharge of the separated lighter liquid is facilitated by the upward slope of the chamber roof towards said outlet, whereat radial ridges or grooves can be arranged in the chamber roof in the manner indicated at 66, thereby to further promote rapid separation and collection of the separated lighter liquid.

The invention, which is particularly suitable for treating aqueous emulsions of oil and grease originating from carservicing plants, such as de-greasing and car-washing plants, is not limited to the aforedescribed and illustrated embodiment, but that the method and apparatus can be modified within the scope of the following claims. More specifically, there can be provided a flushing system (not shown) by means of which solid material deposited in the chambers and lines can be flushed out of the apparatus, to prevent the apparatus from becoming clogged.

We claim:

1. A method of separating an emulsion comprising a heavier liquid and a lighter liquid, using a plurality of closed, liquid-filled vertically arrayed separation chambers having a horizontal extension larger than their vertical extension, and each of which has a lower outlet for the separated heavier liquid, an upper outlet for the separated lighter liquid, and an inlet for emulsion located at a substantial flow-distance from the said two outlets, whereat the separation chambers are kept at an overpressure by causing the heavier and lighter liquids separated gravitationally during the actual separation process to depart from said chambers via a respective one of two pressure-holding vessels containing lighter liquid and a supply of heavier liquid, respectively, and having a weir so located above the uppermost part of the uppermost separation chamber that with the pressure-holding vessels communicating with each other through at least one of the separation chambers equilibrium will occur in the thus formed U-pipe system only when separated lighter liquid is not present beneath the outlet for lighter liquid of the uppermost separation chamber, wherein the emulsion is fed batchwise into at least one separation chamber at a time, at a temperature greater than the temperature of the liquid already present in said at least one separation chamber and in a volumetric quantity which is less than the volume of said at least one separation chamber, and wherein during the introduction of the emulsion into said at least one separation chamber the lighter-liquid outlet of said at least one separation chamber is held closed and the heavier-liquid outlet is held open so that the emulsion charged to said at least one separation chamber displaces a corresponding amount of solely heavier liquid from said at least one separation chamber, and wherein the emulsion inlet of said at least one separation chamber is then closed and the lighter-liquid outlet thereof opened so that lighter liquid separated in said at least one separation chamber from said emulsion during the separation process is forced through said lighter-liquid outlet, by a corresponding amount of separated heavier liquid flowing from the pressure-holding vessel containing said supply of heavier liquid back into said at least one separation chamber.

2. A method according to claim 1, characterized by cooling that liquid present adjacent the bottom of each separation chamber.

3. A method according to claim 1 or claim 2 characterized by using shallow, circular separation chambers whereat emulsion is fed to the centre of the separation chambers and separated lighter liquid is removed at the periphery of said chambers.

4. A method according to claim 2, characterized in that said cooling is carried out by indirect heat exchange with cooled emulsion to be separated.

5. A method according to claim 4, characterized by further heating said emulsion heated by said heat exchange, and by subsequently feeding said emulsion to a separation chamber for separation therein.

6. A method according to claim 5, characterized by using for said further heating physical heat recovered from at least one of said heavier and lighter liquids.

7. A method according to claim 6, characterized by using a heat pump for recovering said physical heat.

8. A method according to claim 1, characterized by maintaining the separation chambers out of communication with at least the pressure-holding vessel containing said lighter liquid during the major part of the separation process.

9. A method according to claim 8, characterized by supplying emulsion to groups of said chambers and discharging separated heavier and lighter liquid from groups of chambers.

10. An apparatus for the separation of an emulsion comprising substantially a heavier and a lighter liquid, said apparatus comprising means for defining a plurality of closed liquid-filled separation chambers arranged one above the other and having a horizontal extension larger than their vertical extension, each of said chambers having a lower outlet for separated heavier liquid, an upper outlet for separated lighter liquid and an inlet for emulsion arranged at a substantial flow-distance from said two outlets, whereat the outlets of said separation chambers for heavier and lighter liquid, respectively, are each connected to a respective pressure-holding vessel containing lighter liquid and a supply of heavier liquid, respectively, with a liquid level located above the uppermost part of the uppermost separation chamber, whereat the liquid levels in the two pressure-holding vessels are so located relative to one another that, with the pressure-holding vessels in communication with each other through at least one of the separation chambers, equilibrium will not occur in the thus formed U-tube system until the separated lighter liquid is not beneath the level of the outlet for lighter liquid of the uppermost separation chamber, wherein the separation chambers communicate with means for heating and introducing emulsion batchwise into at least one separation chamber at a time with the outlet of each said at least one separation chamber for lighter liquid closed and each outlet for heavier liquid open, and wherein means are provided for subsequently closing the emulsion inlet of each said at least one separation chamber at a time and establishing communication via said at least one separation chamber between the heavier-liquid outlet and the lighter-liquid outlet of said at least one separation chamber.

11. An apparatus according to claim 10, characterized in that at least one of the outlets for lighter liquid of the separation chambers discharges into an adjacent superimposed separation chamber.

12. An apparatus according to claim 10 or claim 11, characterized by means for recovering heat from at least one of the separated lighter and heavier liquids.

13. An apparatus according to claim 10 or claim 11 characterized in that the separation chambers are shallow and of circular shape and slope slightly upwardly towards the periphery thereof, whereat the inlet for emulsion to be separated is arranged in the central region of the chambers, and the outlets for separated lighter liquid are arranged at the top of the chambers adjacent the outer periphery thereof.

14. An apparatus according to claim 10, characterized in that each separation chamber is provided adjacent the bottom thereof with liquid-cooling means.

15. An apparatus according to claim 14, characterized in that said liquid-cooling means comprises means for indirect heat exchange of the liquid present adjacent the bottom of the separation chamber with cold emulsion to be separated.

* * * * *